US007129464B2

(12) United States Patent
Buchin

(10) Patent No.: US 7,129,464 B2
(45) Date of Patent: Oct. 31, 2006

(54) LOW-PHOTON FLUX IMAGE-INTENSIFIED ELECTRONIC CAMERA

(76) Inventor: Michael P. Buchin, 723 Southhampton Dr., Palo Alto, CA (US) 94303

( * ) Notice: Subject to any disclaimer, the term of this patent is extended or adjusted under 35 U.S.C. 154(b) by 204 days.

(21) Appl. No.: 10/969,379

(22) Filed: Oct. 19, 2004

(65) Prior Publication Data

US 2006/0081770 A1 Apr. 20, 2006

(51) Int. Cl.
*G01N 21/64* (2006.01)

(52) U.S. Cl. ....................... 250/214 VT; 313/103 CM; 313/105 CM

(58) Field of Classification Search ................ 250/207, 250/214 VT; 313/103 CM, 105 CM, 525, 313/527, 528
See application file for complete search history.

(56) References Cited

U.S. PATENT DOCUMENTS 5,149,972 A * 9/1992 Fay et al. ................ 250/461.1

OTHER PUBLICATIONS

Journal of Biomedical Optics 6(4), 432-440 (Oct. 2001), B.W. Rice, et al., "In vivo imaging of light-emitting probes."

"Validation of a Noninvasive, Real-Time Imaging Technology Using Bioluminescent *Escherichia coli* in the Neutropenic Mouse Thigh Model of Infection", Antimicrobial Agents and Chemotherapy, Jan. 2001, p. 129-137, vol. 45, No.

* cited by examiner

*Primary Examiner*—Thanh X. Luu
*Assistant Examiner*—Tony Ko
(74) *Attorney, Agent, or Firm*—Thomas E. Schatzel; Law Offices of Thomas E. Schatzel, PC

(57) ABSTRACT

A low-photon flux image-intensified electronic camera comprises a gallium arsenide phosphide (GaAsP) photocathode in a high vacuum tube assembly behind a hermetic front seal to receive image photons. Such is cooled by a Peltier device to −20° C. to 0° C., and followed by a dual microchannel plate. The microchannels in each plate are oppositely longitudinally tilted away from the concentric to restrict positive ions that would otherwise contribute to the generation high brightness "scintillation" noise events at the output of the image. A phosphor-coated output fiberoptic conducts intensified light to an image sensor device. This too is chilled and produces a camera signal output. A high voltage power supply connected to the dual microchannel plate provides for gain control and photocathode gating and shuttering. A fiberoptic taper is used at the output of the image intensifier vacuum tube as a minifier between the internal output fiberoptic and the image sensor.

9 Claims, 1 Drawing Sheet

LOW-PHOTON FLUX IMAGE-INTENSIFIED ELECTRONIC CAMERA

BACKGROUND OF THE INVENTION

1. Field of the Invention

Figure 1:
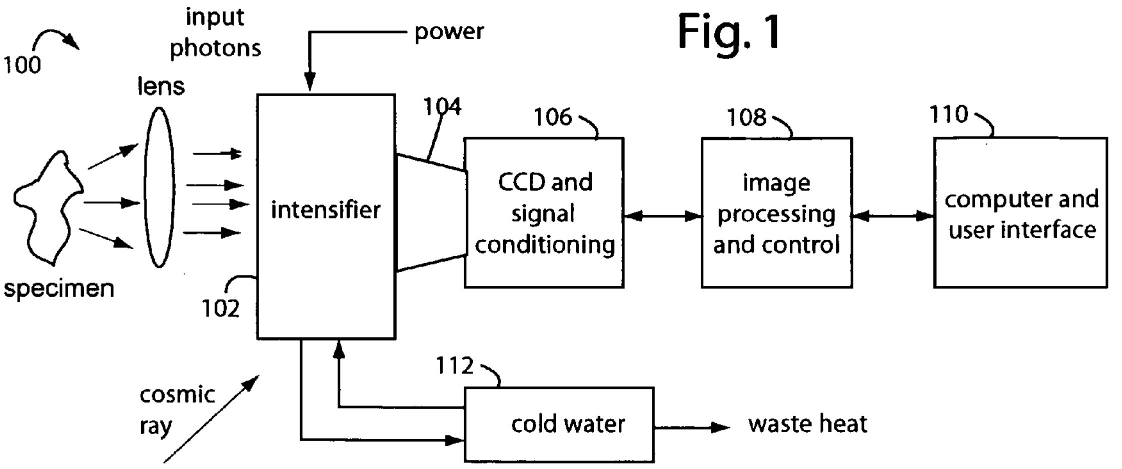

The present invention relates to low-photon flux image-intensified electronic cameras, and in particular to ones that use gallium arsenide phosphide photocathodes and intensifier tubes chilled below zero degrees centigrade with a dual microchannel plate structure, and without an ion barrier film.

2. Description of the Prior Art

Bioluminescent living tissues can be engineered for use in medical studies of live animals, plant cells, plants, and vitro biological samples. A good background in this area was published in the *Journal of Biomedical Optics* 6(4), 432–440 (October 2001), by B. W. Rice, et al., in an article titled, "In vivo imaging of light-emitting probes."

If the bioluminescent tissues are on the surface of an organism, the light emitted can be relatively easy to image with a camera. But if the bioluminescent tissues are internal organs or other structures like tumors, the intervening tissues can reduce the light reaching the camera to levels that can require exposure times well in excess of several minutes just to detect an image.

Luciferase is a photoactive reporter gene that can be imaged in living organisms. Such has been used in laboratory animals and specimens to assess the progression of angiogenesis over time. Transgenic mice used in such research carry a luciferase reporter and a human vascular endothelial growth factor. Living organisms can emit visible light when a luciferin substrate is catalyzed by luciferase and reacts with molecular oxygen. The resulting bioluminescent light is green to red, appears as a result of a chemiluminescent reaction that requires none of the optical excitation needed for fluorescence.

In-vivo imaging can be used to track the progression of a pathogen or tumor in a specimen. The pathogen or tumor is made visible for imaging by modifying the cells to bioluminescence. It is very desirable to be able to superimpose an image of the bioluminescent light on the image of the specimen, e.g., in order to locate and assess the pathogen or tumor relative to its host. But the two cannot be simultaneously shuttered because of the vast difference in light levels.

With prior art charge-coupled bioluminescence camera systems, a five minute long-exposure of an animal subject is used to generate a digital image by collecting a sufficient number of photons in each pixel to generate an image signal that exceeds the image sensor's noise-floor. Imaged over time, the mice in one study showed an increase in bioluminescence that indicated an expression of human vascular endothelial growth factor.

In their article titled, "Validation of a Noninvasive, Real-Time Imaging Technology Using Bioluminescent *Escherichia coli* in the Neutropenic Mouse Thigh Model of Infection", *Antimicrobial Agents and Chemotherapy,* January 2001, p. 129–137, Vol. 45, No. 1, H. L. Rocchetta, et al., reported that a noninvasive, real-time detection technology was validated for qualitative and quantitative antimicrobial treatment applications. The lux gene cluster of *Photorhabdus luminescens* was introduced into an *Escherichia coli* clinical isolate, EC14, on a multicopyplasmid. Such bioluminescent reporter bacterium was used to study antimicrobial effects in vitro and in vivo, using the neutropenic-mouse thigh model of infection.

Bioluminescence was monitored and measured in vitro and in vivo with an intensified charge-coupled device (ICCD) camera system, and these results were compared to viable-cell determinations made using conventional plate counting methods. Statistical analysis demonstrated that in the presence or absence of antimicrobial agents (ceftazidime, tetracycline, or ciprofloxacin). A strong correlation existed between bioluminescence levels and viable cell counts. Evaluation of antimicrobial agents in vivo could be reliably performed with either method, as each was reported to be a sound indicator of therapeutic success. Dose-dependent responses were also detected in the neutropenic-mouse thigh model by using either bioluminescence or viable-cell counts as a marker. By monitoring bioluminescence within live animals, these researchers were able to compare the virulence of three strains of *Salmonella enterica* serovar *Typhimurium,* which carried the lux genes of *P. luminescens* on a multicopy plasmid. In addition, orally infected animals treated with the antibiotic ciprofloxacin were shown to have reduced bioluminescence over the abdominal area.

The ICCD technology was examined for the benefits of repeatedly monitoring the same animal during treatment studies. The ability to repeatedly measure the same animals reduced variability within the treatment experiments and allowed equal or greater confidence in determining treatment efficacy.

Very low light levels from such tissues can be electronically obscured by the background noise or dark currents thermally generated by camera image devices. Prior-art intensified cameras needed long imaging times and suffer from spurious noise events, high dark counts, high integrated background levels that build with long exposures, and high amplitude "scintillation" ion-feedback noise.

Conventional bi-alkali material photocathodes used in intensified platforms have low quantum efficiencies, high background noise, poor resolution and cosmetic quality, and are typically lens-coupled to a charge-coupled device (CCD). Lens-coupling is relatively inefficient and reduces light-collection efficiencies. Higher gains are therefore needed, and higher gains make the whole more susceptible to scintillation and cosmic ray artifacts in the images.

Chilling has been used to reduce thermally generated noise in electronic devices, but sometimes the amount of cooling needed is extraordinary, expensive, and impractical. Cooling the CCD as low as −90° C. is required to reduce dark current in these devices, and back-thinning is used to improve quantum efficiency. Cooled CCD cameras are reported to have reduced read noise levels of 3–5 electrons, and this limits the detection threshold to 10–20 photons per pixel per sample collection interval, for example.

Olympus Biosystems (Germany) has an Internet website at http://www.olympus-biosystems.com, that explains intensified CCD (ICCD) cameras are basically full-performance CCD cameras optically coupled in two possible ways to an intensifier. A so-called proximity-focused intensifier or wafer tube comprises an entrance window, a photocathode, a microchannel plate (MCP) electron multiplier, and a phosphorescent output screen. The photocathode converts the photons into electrons via the photoelectric effect. The quantum efficiency of the conversion is an important parameter and depends on the coating material which differs in the different generations of intensifiers. The photoelectrons are driven to the MCP which is set under a field of several hundred volts. The MCP contains millions of parallel channels with a diameter of about six micrometers in the newest generations. The channels are coated with a secondary electron emitter which generates more electrons when hit by passing electrons. The intensification gain caused by the avalanche effect of multiple collisions is adjustable over a wide range up to several 10,000. The electrons are accelerated by a voltage of several kilovolts upon exiting the MCP before reaching the phosphor screen. They are converted back into photons with an additional multiplication factor. Conventionally, the screen output light is then relayed to the CCD chip either by a lens or fiber-optic coupling. The advantage of relay lens coupling is the possibility of constructing removable intensifiers that enable to easily convert the ICCD camera reversibly into a standard CCD camera or retrofit an existing camera. However, the light efficiency is a function of transmission and inversely of the square of magnification and lens f-number. It is limited and causes a significant loss of signal and a reduced signal-to-noise ratio.

According to Olympus Biosystems, a much more efficient method to optically couple intensifier and CCD chip is with a fiber-optic taper. However, such component requires a very sophisticated manufacturing process. A fiberoptic taper is a bundle of microscopic fibers 2–3 microns in diameter that guide light from the fluorescent screen to the CCD chip. There are up to nine fibers per pixel usually machined directly onto the diode array. Each microfiber has a cladding to maximize light transmission and a stray-light absorbing coating to contain leakage and prevent the resulting contrast reduction. The signal-to-noise ratio of prior art ICCD cameras is usually worse than that of simple cooled and back-thinned CCD cameras due to the inclusion of several additional noise sources in the intensification stage, e.g., thermal noise from the photocathode, multiplication noise from the MCP, and ion-feedback scintillation noise.

SUMMARY OF THE INVENTION

Briefly, a low-photon flux image-intensified electronic camera embodiment of the present invention comprises a high quantum efficiency GaAsP photocathode in a high vacuum tube assembly behind a hermetic front seal to receive image photons. Such is cooled by a Peltier device to −20° C. to 0° C., and followed by a dual microchannel plate. The microchannels in each plate are oppositely longitudinally tilted away from the concentric to restrict positive ions that would otherwise contribute to the generation high brightness "scintillation" noise events at the output of the image. A phosphor-coated output fiberoptic conducts intensified light to an image sensor device. This too is chilled and produces a camera signal output. A high voltage power supply connected to the dual microchannel plate provides for gain control and photocathode gating and shuttering. A fiberoptic taper is used at the output of the image intensifier vacuum tube as a minifier between the internal output fiberoptic and the image sensor.

An advantage of the present invention is that a low-photon flux image-intensified electronic camera is provided with significantly reduced background, zero effective read noise, and high gain that can be used to image single photons.

Another advantage of the present invention is that a low-photon flux image-intensified electronic camera is provided that can produce real-time images of single photon events with zero or near zero sensor background noise.

A further advantage of the present invention is that a low-photon flux image-intensified electronic camera is provided in which real-time and integrated modes can both be used.

A still further advantage of the present invention is that a low-photon flux image-intensified electronic camera is provided in which off-chip digital integration can be used because the dark currents and hot pixels are substantially reduced.

Embodiments of the present invention permit freedom in moving back and forth between shortest detection time/minimum statistical detection threshold and extended exposures/maximum statistics and image quality. Such enables optimization of observation and throughput with a high degree of flexibility.

Another advantage of the present invention is that a low-photon flux image-intensified electronic camera is provided for low light fluorescence, especially single molecule imaging where very low levels of photon emissions are imaged at high speeds. Typically, higher readout speeds drive up the read noise of the CCD. A low noise detector as a preamplifier in front of a low read noise CCD eliminates the read noise problem. Low dark counts and reduced ion feedback allow imaging of small accumulations of photon events from single molecule loci without ambiguity. Higher speed imaging improves the ability to resolve time-dependent changes in intensity and/or localization in single molecule imaging.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
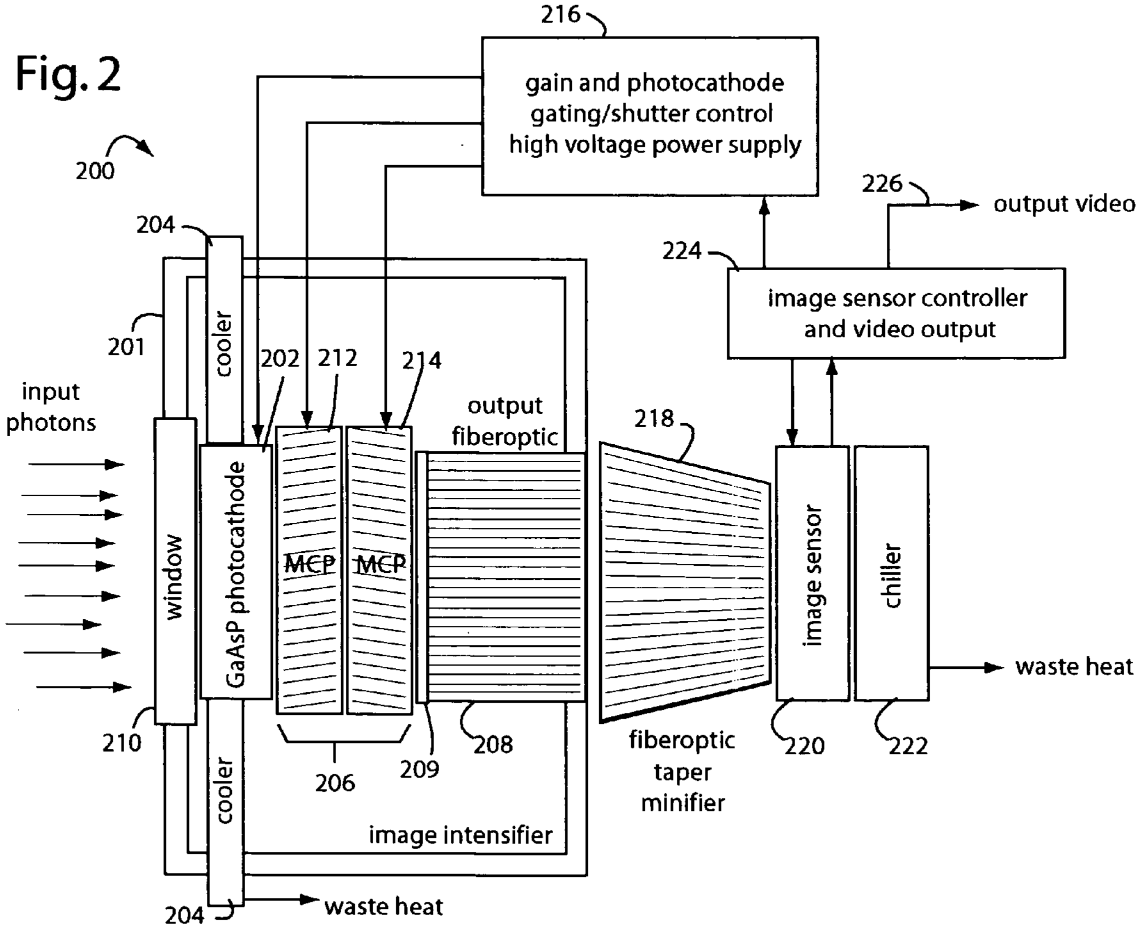

FIG. 1 is a functional block diagram of an intensified camera system embodiment of the present invention; and FIG. 2 is a functional block diagram of a low-photon flux image-intensified electronic camera embodiment of the present invention.

DETAILED DESCRIPTION OF THE PREFERRED EMBODIMENT

FIG. 1 represents an intensified camera system embodiment of the present invention, and is referred to herein by the general reference numeral 100. The intensified camera system 100 collects bioluminescent light photons through a lens from a specimen on an image intensifier 102. Such can be used for separately imaging and then combining reference photos of the specimens and their exceedingly faint bioluminescent emissions. A tapered fiberoptic coupling 104 collects an intensified image produced on the backside of the image intensifier 102 and relays it to a CCD camera 106. An electronic rendering of the photon image is received by an image processor 108 that can make long exposures by digitally integrating frames. Results are sent to a computer and user display 110.

The CCD camera 106 must be a very high quality or scientific-grade device so the image intensifier 102 can be set at lower gain values. Cooling the CCD camera 106 will improve results too by elimination of so-called hot pixels and other thermally affected or generated signal non-uniformities. Such would otherwise build up and accumulate in the sensor or digital image summations to obscure the photon signals of interest.

The image intensifier 102 critically includes a gallium arsenide phosphide (GaAsP) photocathode for converting input photons into electrons for subsequent electronic amplification. Chilling is provided by a Peltier device with the help of an 18° C. cold water circulation system 112. Thermally generated signals, e.g., equivalent background input (ebi) can mimic low level photon inputs. Such ebi is also referred to by manufacturers as "dark current" after conversion or when referenced to an equivalent electron signal in the output detector. The lower the temperature the GaAsP photocathode and CCD are refrigerated to, the better will be the results, e.g., lower ebi or dark currents. Operating the photocathode at zero degrees Centigrade (0° C.) is roughly ten times better than at ambient room temperature, in terms of ebi, and −20° C. is roughly ten times better than 0° C.

Forced air cooling and heatsinks are an alternative way to remove heat from the photocathode cooling system. In a typical embodiment, a fan is remotely placed in a box and the forced air is connected by a hose. This helps keep the mechanical vibrations of the fan motor from disturbing the operation of the camera under high magnification.

Very low ebi values make single photon detection and long frame integration periods possible. But practical considerations limit how much cooling can actually be sustained in the field or afforded in manufacturing. Very low temperatures will promote undesirable condensation, icing, and fogging. Maintaining very low temperatures will require exotic liquefied gas systems and expensive plumbing. Temperatures of at least 0° C. are very practical, and combinations of solid-state Peltier devices with cold water heat removal can provide very affordable cooling down to −20° C.

Cosmic rays generate noise that can occur once every few seconds. These can cause small to large spots of electrons in the intensifier 102 and/or the CCD 106. Such noise can accumulate and obscure the real image signal during long single exposures, e.g., exposures ranging from tens of seconds to many minutes. It is very difficult to remove the noise from the final image if it is allowed to accumulate because the noise is hard to differentiate from the true signal input. Camera system 100 can be run at high speeds with specially designed computer software filter functions to remove the noise before summation. Bursts that appear in only one or two high speed frames can be assumed to be caused by cosmic rays, and the affected frames can be repaired or discarded without much overall degradation.

If high magnifications are being used, any air fans or liquid pumps used in system 100 should be physically remote from image intensifier 102 so not to disturb the imaging with vibrations.

Power to the various internal elements of image intensifier 102 is controlled to change the gain, to shutter exposures, and to prevent damage to the photocathode. Such power can be used to multiplex low-flux images of bioluminescence on normal light images of the specimens hosting the emissions. Photocathode gating can protect the photocathode from being damaged during high light exposures. It further allows for mixed illumination level imaging, e.g., white light underlay. Synchronous shuttering with the illumination sources can be used for additional dark count reductions and eliminating unwanted background signals.

In general, image processor 108 is used to detect and eliminate cosmic ray events from the images. It can do centroid calculations on each photon event for sub pixel level resolution. Images consisting of clusters or recognizable distributions of small numbers of single photons can be generated very quickly, at real time video speeds, e.g., 15–30 frames per second and faster. When digital thresholding of the lowest noise signals is in use and when the MCP is operated at gains of 100 K and higher typically for the dimmest images, each photon signal is easily discriminated against a black, noise free background.

Prior art devices can require several minutes to create an image. A blank image may result if the photon rate is too low and the generated signal buildup is less than the dark current signal and/or read noise buildup.

The spectral response of a GaAsP photocathode is generally from the blue-green to red, e.g., 500–700 nm. This matches exceedingly well with the natural emissions of luciferase. Other, prior art photocathode types are not so well matched with luciferase and have much lower quantum efficiencies and/or higher ebi values. As a consequence, they require higher MCP gains and the undesirable artifacts such high gains can generate will degrade the image.

FIG. 2 represents a low-photon flux image-intensified electronic camera embodiment of the present invention, and is referred to herein by the general reference numeral 200. The low-photon flux image-intensified electronic camera 200 comprises an image intensifier 201 in a vacuum tube with a GaAsP photocathode 202 for converting input photons into electrons for subsequent amplification.

A Peltier cooler 204 is thermally coupled to the photocathode 202 and provides for cooling of the photocathode during operation to a temperature below zero degrees Centigrade. Such photocathode is operated at about 200-volts so the usual ion barrier film can be eliminated.

A dual microchannel plate (MCP) structure 206 is connected to receive electrons converted by the photocathode 202 from input photons by photoelectric emission. A large percentage of the electrons accelerated by the 200-volt cathode voltage to the MCP 206 will strike the edges and kick loose ions.

Conventional devices include an ion barrier film, e.g., a metallization layer, between the photocathode and the MCP 206. The ions returning from the MCP 206 can be electrostatically attracted back to the photocathode 202 and their weight and velocity can cause erosion damage.

But using an ion barrier film can reduce quantum efficiency by 30–40% by screening out a large number of desirable electrons trying to reach the MCP 206 for amplification. The ion barrier film can be disposed of if the photocathode is operated at 200-volts rather than 600–900 volts, and if high quality materials and manufacturing methods are used to reduce gaseous impurities.

Here, the GaAsP photocathode has quantum efficiencies in the range of 30–50% in the visible spectrum from 500-nm to 650-nm, and when cooled to −20° C. has low average equivalent background (ebi) noise counts of better than 0.00005 photons per second per pixel observed from a one centimeter square area for a typical tube with 1K by 1K pixels.

A fiberoptic 208 with a phosphorized faceplate 209 is connected to receive the electron image output from the dual microchannel plate structure 206. The accelerating voltage here is on the order of 6000-volts. The phosphorized faceplate 209 provides for a conversion of amplified electrons back into photons. Such light is more efficiently coupled to an image sensor without a lens relay.

Direct fiberoptic coupling can provide a 5–10 times improvement in light collection efficiency over lens coupling. An input window 210 provides for input photons to enter while being able to maintain the internal vacuum needed to support free-space electron transfer from the photocathode 202 to the dual microchannel plate structure 206.

The phosphor faceplate 209 at the front of output fiberoptic 208 can reflect electrons, ions, and photons in the wrong direction back up into the microchannels in the MCP 206. If the electrons get too deep back up, they can be amplified and produce image artifacts, e.g., bright spots in the image called "scintillation". So, the dual microchannel plate structure 208 includes first and second stages 212 and 214 with microchannels that are chevroned, e.g., oppositely longitudinally tilted away from the concentric straight-line path such that feedback particles at the output do not have ballistic access back to the input. The two stages of MCP 206 together provide a typical adjustable gain of 100K–2M. Such gains are necessary to be able image single photon events with signal outputs from the final sensor that are at measurable levels significantly above any residual detector noise, readout, fixed pattern or otherwise.

In a typical microchannel plate manufacturing process, a hollow billet of lead oxide cladding glass is supported with a rod of etchable core glass and then pulled through a vertical oven, producing a one millimeter diameter "first draw" fiber. Lengths of first draw fiber are then stacked in an array that is drawn to produce a "multifiber". Lengths of multifiber are stacked in a boule and fused under vacuum. The boule is sliced and polished to the required thickness and shape. In embodiments of the present invention, the slicing is done at an angle to get the required longitudinal tilting away from the concentric straight-line path. The solid core is then etched away, leaving the channel array to be fired in a hydrogen oven to produce a semiconducting surface layer with the desired resistance and secondary electron yield. The accelerating potential of about 1000-volts is applied across the two opposite flat surfaces.

A single input electron interacting in a channel of the MCP produces an output beam of thousands of electrons that emerge from the rear of the plate. Since the individual tubes confine the pulse, the spatial pattern of electron pulses at the rear of the plate preserve the image pattern incident on the front surface. In one embodiment, the input side MCP is intimately coupled to a second amplifying MCP structure. The MCP element is followed by an output fiber optic with phosphor deposited on the side facing the output of the MCP gain structure. The composite cathode, MCP, phosphor and output faceplate together constitute the image intensifier. The same microchannel plate technology is used to make visible light and near-infrared image intensifiers for night vision goggles and binoculars.

An electron enters a channel and will trigger an avalanche of electrons to slough off the channel wall via "secondary emission". An electron accelerating potential difference is applied across the length of the channel. These electrons will be accelerated along the channel until they in turn strike the channel surface, freeing more electrons. Eventually this cascade process yields a beam of electrons which emerge from the MCP output.

The cooler 204 preferably includes a multi-stage Peltier solid-state semiconductor device with water cooling. A more exotic and expensive liquefied-gas refrigeration system could also be used cool the photocathode 202 to reduce the dark count. When chilled to −20° C. to 0° C., the photocathode 102 has quantum efficiencies in the range of 30–50% in the visible spectrum from 500-nm to 650-nm, and a low average equivalent background input (ebi) noise component in the image. Typical ebi figures for GaAsP tubes at room temperature are $0.2\times10^{-11}$ lm/cm$^2$.

A 100–200 fold reduction in dark counts, relative to the already low intrinsic ebi figure, is thus made possible by cooling the photocathode to 0° C. to −20° C. After several minutes collection, two to three photons per pixel can easily be detected with digital summation of images captured at a native frame rate of 15–30 frames per second, or faster, and with a typical sensor resolution of 1K by 1K, or 1.4K by 1K pixels.

A controller and high voltage power supply 216 is able to control the gain and shutter-control gating. Camera 200 further comprises a fiberoptic taper minifier 218. Such avoids the use of lens coupling which can reduce the efficiency of detection of the single photon signals formed on the phosphor 209. An image sensor 220, for example a scientific-grade charge coupled device (CCD), is cooled for improved operation by a chiller 222. For example, a Sony XX285 can be used which has high dynamic range, high quantum efficiency, and low read noise, even at high clocking speeds used in real time (nom. 30 frames per second) read out operation. An image sensor controller and signal conditioner 224 produces an analog output for display and a digital output or at least ten bits for transfer to a host computer or image processor and display unit.

Less gain is required to detect each photon event due to the high sensitivity afforded by sensor-fiber coupling combination and low read noise, high performance, fast readout CCD. With typical gains of 100K to 200K, single photon conversion events can easily be detected above the read noise floor with no ambiguity. In some very low flux modes of operation needing high gain, the read noise can be sliced off the bottom levels of the digital image. The remainder is only the true photon image with effectively zero read noise component remaining. Such zero read noise frames can be digitally summed for statistical integration and gray scale reporting.

In one embodiment, the CCD imager 120 is also cooled with a one or two-stage Peltier device to reduce dark current and hot pixel amplitudes. Cooling the CCD allows for extended exposures of tens of seconds, or longer. Images may be accumulated over time to allow a user to detect the weakest signals or to improve the statistical quality of the final image. Prototypes have provided image detection at real time video speeds with low statistics. Sub-video rates, e.g., one second exposures with 4–8 frames of rolling averaging, have been obtained with good gray scale rendition. Very long, extended digital accumulation of images equating to 15–30 minutes of exposure have also been achieved. Images in a 1K by 1K format have been accumulated for up to two hours before reaching an average of one dark count noise photon per pixel using the cooling methods described here, and the typical ebi values that result in combination with digital noise thresholding and digital summation.

Additional sensitivity and speed can be realized in embodiments by binning pixels, e.g., bins of 2×2 or 4×4, at the expense of resolution.

The high-voltage power supply 116 provides electronic gating or shuttering of the photocathode of the image intensifier tube. Gating or shuttering is done by controlling the bias voltage to the photocathode. Such bias is required for the conversion of photons to electrons and subsequent transfer of these electrons to the next stage of the image intensifier tube. With no bias or "on" voltage, the cathode will also be protected from damage that may arise from inadvertent exposure to high light levels. The image intensifier tube can be put in a standby mode, and the experimental apparatus may be modified or opened up to high light levels typically encountered in room light, for the purpose of introducing, removing and/or arranging samples for subsequent imaging.

Once the samples are in place, the photocathode gate may be activated for short periods of time, acting as a partial light shutter, thereby allowing the collection of a visible light image of the sample. By controlling the gate on/off time, either with fixed settings or automatically, a suitable effective light level may be maintained at the photocathode, to allow collection of non-luminescence images for archival or reference purposes, without causing excessive photon-electron conversion in the photocathode material.

The apparatus can be enclosed to seal out ambient room light. A very dim controlled light inside can be used as illumination to take a reference image. Image processing and control 108 may provide image averaging to compensate for statistical noise in the lower light reference image. Gating the photocathode also allows the samples or apparatus to be adjusted under direct view with relatively high level room lighting or purposely introduced controlled illumination. Such may provide image averaging to compensate for statistical noise in the low light reference image. Gating the photocathode allows the samples or apparatus to be adjusted under direct view with the relatively high-level room lighting.

Camera system embodiments of the present invention include a front-end module with a dual microchannel plate image intensifier tube. A GaAsP photocathode material is used that exhibits quantum efficiency in excess of 30% over much of the visible spectrum and has vary low dark counts (equivalent background input) relative to other photocathode materials such as GaAs. The usual ion barrier film is not included for added sensitivity. A cooling mechanism is connected to the photocathode to reduce the temperature of the photocathode substantially below ambient, e.g., below 0° C., and nominally −20° C. A means for removing heat that might be generated as a by-product of the cooling process (use of Pettier thermoelectric devices) can be provided in this mechanism. For similar gains compared to a single stage MCP, the dual microchannel plate amplifies the electrons produced by the photocathode with more gain and less ion feedback high amplitude spot noise. An amplified light image is produced on a phosphor coated fiberoptic faceplate that conducts this image out of the intensifier tube assembly. The image is transferred by a fiberoptic taper. Such can transfer and reduce the image from the input end in contact with the output of the intensifier tube to an image sensing area array of pixels at the output end, e.g., to fit the image sensing area. Alternatively, such fiberoptic element may be a 1:1 ratio straight-through fiberoptic faceplate. The image sensor may be cooled via another process so that the amount of dark current, hot pixels, and other temperature sensitive non-uniformities, or gain variations in the detector, will be minimized during exposures in excess of one second.

A low-light or scientific-grade image sensing array is attached to an electronics control and processing module that generates the control signals and voltages necessary for operation of the image sensor array. Such also converts the electronic signals from the image sensing array to image formatted signals. The high voltage power supply and controller provides for control voltages that operate the intensifier and allow gain control and on-off control of the photocathode for shuttered or modulated exposures.

For the photocathode 202, embodiments of the present invention can use GaAsP, extended red GaAsP, AlGaAs, and other photocathode image intensifier tubes with better than 30% quantum efficiencies at peak over most of the visible spectrum, and with a low "ebi". Such need to be cooled to temperatures below 0° C. by a combination of Peltier cooling and recirculating liquid method for removal of the heat by-product. A combination of Peltier cooling and radiative heat sink and fan combinations can also be used. A liquid nitrogen or some other benign liquid or gaseous coolant can be included to further reduce dark counts. Embodiments of the present invention incorporates multistage MCP structures and do not use an ion barrier film. The embodiments further include CCD camera detectors with fiberoptic coupling for high light collection efficiency. Such CCD camera detectors include low read noise, high sensitivity, high resolution, high dynamic range scientific grade CCD or CMOS imaging devices. Thermoelectric cooling of the CCD is used to reduce dark current and hot pixel effect so that extended exposures can be used.

The present invention does not exclude single stage MCP structures instead of multistage, or the inclusion of ion barrier films, or the use of relay lens coupling of a CCD or CMOS camera detector instead of the fiberoptic coupling 118.

A high-speed operation mode, e.g., real-time 30-frames per second, is provided in camera 200 for survey modes or dynamic event capture. Flexible pixel sizing with binning can be used to optimize speed, sensitivity, and resolution. Electronic gating/shuttering of the photocathode is used in embodiments of the present invention for automatic light level compensation between dark and white light/reference image conditions, protection from excessive light level exposure, use in a fluorescence lifetime detection process, and use in other imaging methods where amplitude and/or phase shifts between illumination and emission photons are exploited.

Alternative embodiments of the present invention include a low photon flux imaging system, such as shown in FIG. 1, but further comprising a lens, light-tight box, a focusing mechanism for the lens, and a movable stage. Such would allow for high speed collection of luciferin-luciferase reaction single-frame images of 0–10 photons per pixel originating from living cells. Single photons can be delineated by operating the dual MCP at gains in excess of 10,000, depending on the quality of the CCD and signal conditioning electronics. On chip integration at high gains can be used, or digital RAM integration off chip can be used for real time display of accumulation and for improved dynamic range. Black level slicing and cosmic ray filtering ahead of integration and summation can also be used to further improve results.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A low-photon flux image-intensifier, comprising:

a gallium arsenide phosphide (GaAsP) photocathode for converting input photons into electrons for subsequent amplification;

a cooler thermally coupled to the photocathode and providing for cooling of the photocathode during operation to a temperature below zero degrees Centigrade; and a dual microchannel plate (MCP) connected to receive electrons converted from photons by the photocathode, and providing an amplified beam of electrons at its output; and a phosphor faceplate positioned to receive said amplified beams of electrons from the MCP and to convert them into visible light for imaging by a camera;

wherein the dual MCP includes first and second stages that have channels oppositely tilted away from the straight-line path between the photocathode and the phosphor faceplate, such that scintillation events are reduced in an output image.

2. The low-photon flux image-intensifier of claim 1, wherein no ion barrier film is disposed between the photocathode and dual MCP.

3. The low-photon flux image-intensifier of claim 1, wherein:

the GaAsP photocathode has quantum efficiencies exceeding 30% in the visible spectrum from 500-nm to 650-nm; and the cooler provides for chilling of the GaAsP photocathode during operation substantially below ambient for further reduced equivalent background (ebi) noise counts such that non-ambiguous single-photon detection is possible.

4. The low-photon flux image-intensifier of claim 1, wherein:

the cooler includes a Peltier solid-state semiconductor device and a cold water recirculation system.

5. The low-photon flux image-intensifier of claim 1, further comprising:

a fiberoptic connected to receive said image output from the phosphor faceplate for coupling to an external camera.

6. The low-photon flux image-intensifier of claim 1, wherein:

the dual microchannel plate structure includes first and second stages with microchannels that are oppositely longitudinally tilted away from the concentric straight-line path such that feedback ions at the output do not have ballistic access back to the input.

7. A low-photon flux image-intensified camera, comprising:

a gallium arsenide phosphide (GaAsP) photocathode for converting input photons into electrons for subsequent amplification, wherein no ion barrier film is associated with the photocathode;

a cooler thermally coupled to the photocathode and providing for cooling of the photocathode during operation to a temperature below zero degrees Centigrade;

a dual microchannel plate structure connected to receive electrons converted from photons by the photocathode, wherein stages are oppositely tilted to control scintillation events;

a phosphorized faceplate and fiberoptic connected to receive the electron image output from the dual microchannel plate structure, and providing for a conversion to photons that are coupled to an image sensor without lens coupling; and an image sensor (CCD) for receiving intensified images from the dual microchannel plate structure.

8. The camera of claim 7, wherein:

the photocathode has quantum efficiencies in the range of 30–50% in the visible spectrum from 500-nm to 650-nm, and low average equivalent background (ebi) noise counts in the image; and the cooler includes at least one of a Peltier solid-state semiconductor device and a liquefied gas system.

9. The camera of claim 7, further comprising:

a power supply connected to the photocathode and dual microchannel plate structure, and providing for gain control, shutter control, and photocathode protection from high level light exposure.

* * * * *